United States Patent
Tarnopolsky et al.

[11] 3,729,837
[45] May 1, 1973

[54] GRAPHICS TEACHING MACHINE

[76] Inventors: Igor Rafailovich Tarnopolsky, ulitsa Zavooskaya 33, kv. 27; Gennady Vasilievich Akimtsev, ulitsa Furmanova 23, both of Frunze, U.S.S.R.

[22] Filed: Feb. 23, 1972

[21] Appl. No.: 228,703

[52] U.S. Cl. .................................................35/9 R
[51] Int. Cl. .............................................G09b 7/00
[58] Field of Search.....................35/9 R, 9 C, 48 R

[56] References Cited

UNITED STATES PATENTS 3,106,027   10/1963   Thelen...................................35/9 C

*Primary Examiner*—Wm. H. Grieb
*Attorney*—John C. Holman, Herbert Cantor, Marvin R. Stern and Dennis O. Kraft

[57] ABSTRACT

A graphics teaching machine for teaching a student includes: a graphic answer input device, a logic unit and a data unit interconnected in series, as well as a control unit connected to the logic and data units. The logic unit in turn comprises a coder, a decoder and a comparison assembly interconnected in series, while the data unit comprises a "prompting" assembly, a display and a mark-giving assembly interconnected in series, the input of each of these assemblies being connected to the output of the comparison assembly. The decoder uses an AND-circuit that operates in case the student gives a correct answer, and a delay element resetting this circuit to its original state with certain time delays after its operation.

4 Claims, 2 Drawing Figures

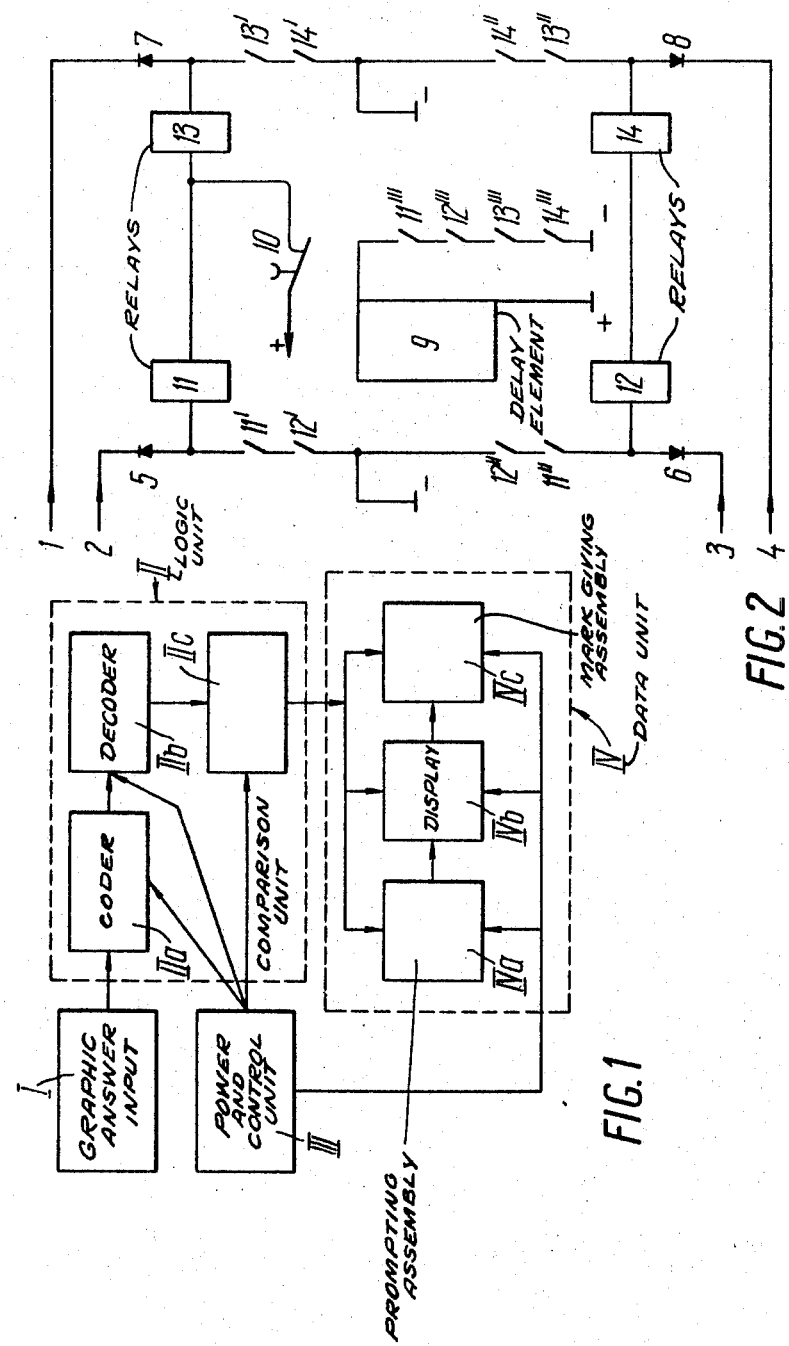

GRAPHICS TEACHING MACHINE

BACKGROUND OF THE INVENTION

Field of the Invention

The invention relates to teaching machines and, more particularly, to machines for graphics teaching.

The present machine is intended for teaching and checking the knowledge of students in descriptive geometry and technical draftsmanship. It can also be used in studying other technical physical and mathematical branches of science where graphical solutions of problems are possible.

Widely known in the art are graphics teaching machines that comprise: a student's graphic answer input device, a logic unit, a data unit and a control unit. The student's graphic answer input device in such machines comprises the following elements superposed on one another: a contact-bearing board, a punched card, a current-carrying plate and a problem blank. The logic unit coupled with the answer input device is made up of a coder, a decoder and a comparison assembly, all connected in-series, while the data unit contains a "prompting" assembly, a display and a mark-giving assembly, also connected in-series. Coupled with the data unit and the logic unit is a control unit.

The above machine operates as follows.

The student using drawing instruments plots a line or figure on the problem blank of the answer input unit and then punctures the problem blank at certain points of the drawn line with the help of a pair of conducting compasses. If the plotting of the drawn line has been done correctly and the contact points (punctures) have been marked properly, two contacts of the contact-bearing board will close and produce an electric pulse that will be fed to the logic unit of the machine. Here this pulse will be compared against the programme stored in the memory of the machine.

After the answer is compared against the stored programme, it is either accepted or rejected by the machine. The result of the comparison is made known to the student by a display providing a corresponding audio or light signal. In case a first part of the problem is solved correctly the machine will be ready to receive the answer to the subsequent part of the problem. If the answer is wrong the student will have to continue solving the incorrectly solved or unsolved part of the problem until he can feed the machine with a correct answer.

However, the above said machines known in the art suffer from a number of serious disadvantages.

Firstly, although such machines require that the student gives his answer in the graphical form, they, nevertheless, require that he should additionally spend some time and effort to carry out the contacting procedure.

Secondly, the result of making contacts of the contact-bearing board with the compasses is ambiguous since any straight line contains an infinity of point pairs defining this line. Therefore, to enable the student to select two definite points on a line of the plot he is drawing, it is necessary either to specify or precondition the selection of the contacting points. And this is practically unattainable, the whole idea of plotting the required drawing in this case becomes futile. In fact, if the student is given the positions of contacting points beforehand, there will be no need for him to plot the required line according to other parameters he might choose.

SUMMARY OF THE INVENTION

The object of the present invention is to provide a graphics teaching machine which will allow a student to present his graphical answer in the natural way, i.e. by actually plotting the lines of a drawing, diagram or chart without performing any auxiliary actions or operations.

This object is achieved by providing a graphics teaching machine comprising: a student's graphic answer input device having a contact-bearing board, a punched card, a current-carrying plate and a problem blank, all successively superposed on one another; a logic unit coupled with the answer input device and incorporating a coder, a decoder and a comparison unit, all connected in series; a data unit made up of a "-prompting" assembly, a display and a mark-giving assembly, connected in series, an input of each of said assemblies being connected to an output of the comparison assembly; a control unit connected to the data unit and to the comparison assembly, in which, according to the invention, the decoder comprises an AND-circuit operating when the student's answer is correct and having its inputs connected to the answer input device via respective identically connected diodes of the coder, and a delay element resetting the AND-circuit to its original state with a given time delay after its operation, the input of the delay element being connected to the output of the AND-circuit.

The herein disclosed graphics teaching machine ensures the natural way of student's work, requires no special training of the user and is highly reliable. Besides, it provides for quick automatic changeover from one programme to another to be performed by the student himself.

BRIEF DESCRIPTION OF THE DRAWING

The invention will be better understood from the description of an embodiment given by way of example with reference to the accompanying drawings, in which:

FIG. 1 is a block diagram of a graphics teaching machine;

FIG. 2 is a schematic diagram of the decoder of the machine logic unit, according to the invention.

DETAILED DESCRIPTION OF PREFERRED EMBODIMENT

The graphics teaching machine disclosed herein comprises a grphic answer input device 1 (FIG. 1) containing a contact-bearing board, a punched card, a current-carrying metal resilient plate and a problem blank, all superposed successively on one another (not shown in the drawing). This device I is electrically coupled with a coder II $a$, a decoder II $b$ and a comparison unit or assembly II $c$ which are connected in-series to form a logic unit II of the machine. The logic unit, in its turn, is coupled with a control unit III of the machine and a data unit IV which is also electrically connected to the control unit III. The data unit IV is a series combination of a "prompting" assembly IV $a$, a display IV $b$ and a mark-giving assembly IV $c$.

The decoder (FIG.2) is arranged as an AND-circuit the inputs 1, 2, 3 and 4 of which are connected to the graphic answer input device 1 (FIG.1) via respective identically connected diodes 5, 6, 7 and 8 of the coder II a. The output of the AND-circuit is connected to the comparison assembly II c via a delay element 9 and an electromechanical relay 10.

The AND-circuit can be arranged, for instance, around four electromechanical relays 11, 12, 13 and 14 with corresponding groups of contacts 11', 11'' and 11''', 12', 12'', and 12''', 13', 13'' and 13''', 14', 14'' and 14'''.

The machine is provided also with a control unit III intended to connect it to a power supply (not shown in the drawing) as well as to select the machine - mode of operation ("Check"-"Teach").

The machine operates in the following way.

While plotting the required element of the drawing on the problem blank of the graphic answer input device 1, the student by pressing his pencil against the paper makes the current-carrying resilient metal plate (foil) sink through holes in the punched card, due to which the foil touches the group of contacts on the contact-bearing board located along the line drawn by the student.

If the student has drawn the line in accordance with the preset memorized programme the foil sinking through the holes will touch also the two contacts of the contact-bearing board that define the required straight line. Simultaneously each of the two contacts will feed the logic unit II (FIG. 1) of the machine with two separate signals each of which will also be applied to the coder IIa. Now, if these signals correspond to the preset programme, they will pass through the respective inputs 1, 2, 3 and 4 (FIG.2) to the decoder IIb. Here, the signals passing through the conductors 2 and 3 arriving at relays 11 and 12 will block the latter, while the signals through the conductors 1 and 4 will block relays 13 and 14. Since the relays 11, 12, 13 and 14 are blocked, a signal will arrive at the comparison assembly IIc to be noted as a correct solution of the instant part of the plotting made by the student. Besides, the comparison assembly IIc delivers a signal to the display IV b of the data unit IV to inform the student that his answer has been accepted (one of the indication lamps of the display IV b goes out). After the student finishes plotting all the pre-programmed lines of the required drawing and does this correctly, the machine will also trigger a light indicator "Problem solved" (not shown in the drawing) and the mark-giving assembly IV c which (in the "Check" mode) will show to the student the mark he got that appears on a digit tube (not shown in the drawing either).

To enable the student to present any number of answers to the problems pre-programmed in the machine, the circuit of the latter is arranged so that when the relays 11, 12, 13, and 14 operate their contacts 11''', 12''', 13''' and 14''' will also be blocked. This will enable the delay element 9 to function for a period required for the operation of the successive relays of the comparison assembly IIc. After said period of functioning of the delay element 9 and after the preset time period for the signals to arrive from the decoder IIb to the comparison assembly IIc is over, the delay element 9 will, disconnect the output by means of the relay 10, whereupon the supply circuit of the relays 11, 12, 13 and 14 which thus will become unblocked.

Now these relays are again ready to receive a new group of signals corresponding to the next step of the plotting.

In case the student finds it difficult to solve a part of the problem he can apply for help to the machine which will "prompt" him after he presses the respective button. The "prompt" is presented in the form of an image on a transparent screen. Every "prompt" is a film frame with the graphic image of a part of the plot to be drawn according to the problem.

In the "Check" mode, the mark-giving assembly IVc notes every case when the student asks the machine to prompt him. Moreover, these cases are not only noted but are also differentiated as regards the complexity of the problem. After the student finishes solving the problem the machine presents a result in the form of a mark 2, 3, 4, or 5.

What is claimed is:

1. A graphics teaching machine comprising: a student's graphic answer input device with a contact-bearing board, a punched card to be superposed on said contact-bearing board, a current-carrying conductive sheet superposed on said punched card, a problem blank which is used by the student to write upon and which is superposed on said current-carrying conductive sheet which electrically contacts the contact-bearing board through apertures in the punched card when the student draws on said problem blank; a logic unit coupled with said graphic answer input device and incorporating a coder employing diodes, a decoder connected to said coder and including an AND-circuit having a plurality of inputs and an output and operating when the student gives a correct answer and which is connected to said graphic answer input device via said diodes connected identically at said inputs of said AND-circuit, a delay element which resets said AND-circuit to its original state with a given time delay after its operation and which is connected to this AND-circuit, a comparison assembly connected to said decoder and having an input and an output; a data unit coupled with said logic unit and including a "prompting" assembly having its input; a display connected to said "-prompting" assembly, a mark-giving assembly connected to said display and having its input, the input of each of said, prompting assembly, display and mark-giving assembly being connected to the output of said comparison assembly; and a control unit connected to said data unit and to said logic unit, effecting power supply to the teaching machine.

2. A graphic teaching machine as claimed in claim 1, wherein said AND-gate has four inputs, each of said four inputs being connected with a corresponding diode of said coder.

3. A graphic teaching machine as claimed in claim 1, wherein the output of the AND-circuit is connected to said comparison assembly via said delay element and an electromechanical relay whereby the AND-circuit may be reset to its original state.

4. A graphics teaching machine as claimed in claim 1 wherein said conductive sheet is a resilient metal foil.

* * * * *